Patented May 24, 1927.

1,629,618

UNITED STATES PATENT OFFICE.

SIGURD GRÖNNINGSAETER, OF BROOKLYN, NEW YORK, ASSIGNOR OF ONE-HALF TO FISCHER HOLLINSHED CO., INC., OF NEW YORK, N. Y., A CORPORATION OF NEW YORK.

PROCESS OF TRANSFERRING VITAMINES.

No Drawing. Application filed November 2, 1926. Serial No. 145,915.

This invention relates to processes of treating vitamine containing substances whereby the vitamines contained therein are liberated therefrom and are transferred to other substances which it is desired to activate or enrich with vitamines.

It has been heretofore proposed to extract the fat soluble vitamines from fat materials containing same by reacting a vitamine containing material, as cod liver oil, with a hydroxide of either the alkali metals as sodium or potassium or the alkaline earth metals as barium and calcium in the presence of an organic solvent such as alcohol, ether, benzine, and the like, separating the soap thus formed from the reacted mass, and recovering the extract containing the fat soluble vitamines therefrom. The extract having the fat soluble vitamines dissolves therein is then concentrated, and the vitamines recovered in a dry state by subjecting same to a vacuum or an atmosphere of inert gas.

It has also been proposed to increase the vitamine content of oils and fats normally deficient in vitamines by agitating oils deficient in vitamines with a soap solution formed by the saponification of a marine animal oil or oils containing the A—or fat soluble vitamines with caustic soda, and deodorizing the oils thus impregnated with vitamines by subjecting same to superheated steam.

I have found that the vitamines contained in vitamine containing materials such as cod liver oil, butter, egg oils, or any other suitable oil, grease, or fat high in vitamine content, may be transferred to, vegetable, animal or mineral oils, particularly the edible vegetable oils, as cotton seed oil, by saponifying or reacting the vitamine containing material with an alkaline hydroxide in the presence of an organic solvent medium as alcohol, to form a solution of the vitamines liberated or released by such action, adding the substances to be activated or enriched to the reacted mass, and then transferring the vitamines contained in the solution by the addition of a diluent as water, to the reacted mass.

It is necessary that the process be conducted at relatively low temperatures as high temperatures kill the vitamines. The water causes the vitamines to be released from the solvent medium and thus enables such vitamines to be readily and quickly taken up by the substance to be activated or enriched. The presence of the organic solvent liquid as alcohol during the saponification step of the process results in the formation of a solution containing the fat soluble vitamines given up or released by the vitamine containing substance. Such solution readily releases the vitamines upon the addition of water to the mixture and thus enables the vitamines contained in the solution to be transferred to the substance to be activated or enriched in practically quantitative amounts. By this process it is possible to transfer the vitamines contained in vitamine containing substances to other substances in a commercially practical manner.

Accordingly, one of the objects of this invention resides in the process of treating vitamine containing substances in the presence of an organic solvent medium whereby the vitamines are released and are immediately taken up or dissolved in the said organic solvent medium.

Another object of this invention resides in the transferring of the vitamines dissolved in an organic solvent medium to another substance.

A further object of this invention resides in first causing the vitamines contained in vitamine containing materials to be dissolved in or taken up by an organic solvent medium, then adding thereto the material to be treated, and then effecting the transferring of the vitamines from said organic medium to said substance by the addition of a diluent thereto.

Other and further objects of this invention will appear from a more detailed description of this invention set forth below, it being understood that various changes may be made therein by those skilled in the art without departing from the scope and spirit of this invention.

The vitamine containing material such as cod liver oil, butter, egg oils or any other suitable oil, grease, or fat high in vitamine content is mixed with an organic liquid; e. g., alcohol, benzine, ether, or the like, which is capable of dissolving the vitamines contained in the vitamine containing material. The amount of the organic liquid utilized is preferably about 50 to 60 per cent of the cod liver oil used. An aqueous solution of an alkaline hydroxide, preferably, sodium hydroxide is then added to the mixture and the mixture is heated for about one-half hour to the boiling temperature of the organic solvent. A saponification takes place with the consequent formation of a soap. The vitamines contained in the unsaponifiable matter are released during the saponification step and are dissolved in or are taken up by the alcohol to form a solution thereof.

As the reacted mass usually contains a slight excess of sodium hydroxide, usually approximately 10 per cent, it is desirable to neutralize such excess of hydroxide. This may be accomplished by any suitable neutralizing medium, but, in the interest of safety, I preferably proceed by the addition thereto of a calculated amount of a harmless neutralizing agent as sodium bicarbonate. The resulting neutralized solution is then added to a quantity of the substance to be vitaminized, activated or enriched, e. g., to vegetable, animal or mineral oil which has preferably been heated to a temperature of about 50° C., and the mass is slowly agitated for a short interval of time. Water is then added to the mixture and the mass is then agitated for a period of about 10 minutes or longer. The vitamines contained in the solvent as alcohol, are transferred into the oil to be treated. The alcohol containing the vitamines becomes diluted by the addition of the water thereto thus diluting the alcohol to such an extent that the alcohol is no longer able to hold or retain the vitamines in solution, and the vitamines are consequently released by the alcohol and they are absorbed or taken up by said oil as quickly as they are released from the alcohol. It is thought that up to the time that the water is added that the vitamines are dissolved or retained within the alcohol, and that when the water is added to the mixture the alcohol becomes diluted to such an extent as to destroy the ability of the alcohol to retain the vitamines in solution, with the result that the vitamines are readily released by the alcohol and absorbed or taken up by the oil.

The mixture is then allowed to remain quiescent for a certain period of time in order to permit the oily layer containing the vitamines and the aqueous soap containing layer to stratify. The thus activated or enriched oil is then separated from the soap solution and may be washed in water at a temperature of about 50° C., until it shows a neutral reaction with phenolphthalein. The resulting vitaminized substance may be refined by treating it with ordinary steam at atmospheric pressures. It is possible by this process to obtain a product having approximately 60 to 70 per cent of the vitamines contained in the original vitamine containing material.

As a specific example of practicing the process as above set forth, the following procedure may be followed:

250 grams of cod liver oil is added to about 160 cc. of alcohol of about 96 per cent strength, and the mixture is then heated on water bath to about a temperature of 60° C. under a reflex condenser. 76 cc. of an aqueous solution of sodium hydroxide is then added to the cod liver oil mixture and the mass is then heated to a temperature of 80° C., for about 30 minutes. This results in the saponification of the cod liver oil with the consequent formation of a soap. The strength of the sodium hydroxide solution is approximately 0.483 gram of sodium hydroxide (NaOH) per cc. corresponding to a saponification value of 187.26, calculated on potassium hydroxide (KOH) and an alkali excess of 10 per cent.

The soap solution thus formed is then mixed with 125 cc. of an aqueous solution of sodium bicarbonate containing 5.6 grams of $NaHCO_3$ in order to neutralize the excess of sodium hydroxide in the soap solution.

This neutralized soap solution, at a temperature of about 50° C., is then gradually added to 500 grams of vegetable oil of approximately the same temperature while the mass is constantly agitated and this agitation is continued for 10 minutes or longer. Thereafter about 500 cc. of water is added to the mixture while agitation is continued for a further period of 10 minutes or longer. When the water is added it breaks up the solution of vitamines in the alcohol and causes the transfer of the vitamines to the vegetable oil. The reacted mass is then allowed to stand quiescent for about an hour in order to permit the oily layer to become separated from the aqueous soap solution. The oil is then drawn off or separated from the soap solution. The vegetable oil containing the vitamines may then be washed with water heated to a temperature of about 50° C., the washing being continued until the wash water shows a neutral reaction with phenolphthalein. The oil containing the vitamines may then be refined by subjecting it to ordinary steam for about an hour under atmospheric pressure.

The aqueous soap solution may be treated with salt or sodium chloride so as to separate the soap therefrom. The soaps thus recovered may then be acidulated and marketed as fatty acids.

The alcohol may be recovered from the aqueous solution after the soap has been recovered by distilling the same.

The vitaminized oil resulting from the process of this invention may be used for medical or other purposes and may be utilized in the manufacture of foods.

This invention should not be confused with processes directed to the production of a highly concentrated extract. It is not applicant's purpose to produce a highly concentrated extract of vitamines, but it is the purpose of this invention to transfer vitamines from a material containing them into another material or substance in order that the latter substance may be activated or enriched. This process of vitaminizing substances by a transferring over of the vitamines is, so far as I am aware, absolutely novel, and it is found, in practice, that the process hereinbefore described may be economically and efficiently carried out.

The foregoing detailed description sets forth the invention in its preferred practical form, but the invention is to be understood as fully commensurate with the appended claims.

Having thus fully described the invention, what I claim as new and desire to secure by Letters Patent is:

1. The process of transferring vitamines, which consists in reacting a vitamine containing material with an alkaline hydroxide in the presence of a solvent medium, adding a substance to be vitaminized to the reacted mass, and adding a diluent to the said mixture to cause the transfer of the vitamines to said substance.

2. The process of transferring vitamines, which consists in extracting the vitamines from vitamine containing material, forming a solution of the thus extracted vitamines, adding a substance to be vitaminized to the said solution, and adding a diluent to said mixture to cause the transfer of the vitamines to said substance.

3. The process of transferring vitamines, which consists in reacting a vitamine containing material with sodium hydroxide in the presence of alcohol, adding a substance to be vitaminized to the reacted mass, and adding water to the said mixture to cause the transfer of the vitamines to said substance.

4. The process of transferring vitamines, which consists in reacting a vitamine containing material with sodium hydroxide in the presence of an excess of alcohol at a temperature of approximately 80° C., adding a substance to be vitaminized to the reacted mass, and adding water to the said mixture to cause the transfer of the vitamines to said substance.

5. The process of transferring vitamines, which consists in reacting a vitamine containing material with an alkaline hydroxide in the presence of a solvent medium, neutralizing the excess of the hydroxide in the reacted mass, adding a substance to be vitaminized to the said mass, and adding a diluent to the said mixture to cause the transfer of the vitamines to said substance.

6. The process of transferring vitamines, which consists in reacting a vitamine containing material with an alkaline hydroxide in the presence of a solvent medium, neutralizing the excess of the hydroxide in the reacted mass, adding a substance to be vitaminized to the said mass, adding a diluent to the said mixture to cause the transfer of the vitamines to said substance, and recovering said substance, containing the vitamines, from the said mixture.

7. The process of transferring vitamines, which consists in reacting a vitamine containing material with sodium hydroxide in the presence of alcohol, adding an oil to the reacted mass, and adding water to the said mixture to cause the transfer of the vitamines to said oil.

8. The process of transferring vitamines, which consists in reacting a vitamine containing substance with sodium hydroxide in the presence of an excess of alcohol at a temperature of approximately 80° C., adding oil to the reacted mass, and adding water to the said mixture to cause the transfer of the vitamines to said oil.

In testimony whereof I have signed the foregoing specification.

SIGURD GRÖNNINGSAETER.